Aug. 20, 1968   W. A. STOLZ ET AL   3,397,572

DEVICE FOR MEASURING STRESS-STRAIN CURVE

Filed March 1, 1966

INVENTORS
JOSEPH M. KRAFFT
FRANK W. BIRD
WALTER A. STOLZ, DECEASED
BY MARY ANN LYNOTT STOLZ

BY *Melvin L. Crane* AGENT

*signature* ATTORNEY

United States Patent Office 3,397,572
Patented Aug. 20, 1968

3,397,572
DEVICE FOR MEASURING STRESS-
STRAIN CURVE
Walter A. Stolz, deceased, late of Arlington, Va., by Mary
Ann Lynott Stolz, administratrix, 1368 N. Washington
Ave., Scranton, Pa. 18509, and Joseph M. Krafft, 1709
Oakcrest Drive, Alexandria, Va. 22302, and Frank
W. Bird, 7204 Alger Road, Falls Church, Va. 22042
Filed Mar. 1, 1966, Ser. No. 532,551
9 Claims. (Cl. 73—94)

ABSTRACT OF THE DISCLOSURE

The present invention is directed to an apparatus for dividing the deforming stroke of a compression sub-assembly into a series of abruptly interrupted steps. A rigid cylindrical case is secured to the base of a high-strain-rate testing machine. With a sliding fit therein, a coaxial plunger is connected to the movable head of the loader. The plunger can be driven by the machine into solid abutment with the bottom of the case. This bottom is penetrated in its central region by a coaxially threaded base anvil supporting a cylindrical compression specimen. A graduated dial on the threaded anvil permits control of the extent of its protrusion above the stop. The testing machine head, first withdrawn to permit its protrusion to a portion of the total stroke, is actuated to squash the plug flush with the bottom. This procedure is repeated in steps.

---

Figure 1:
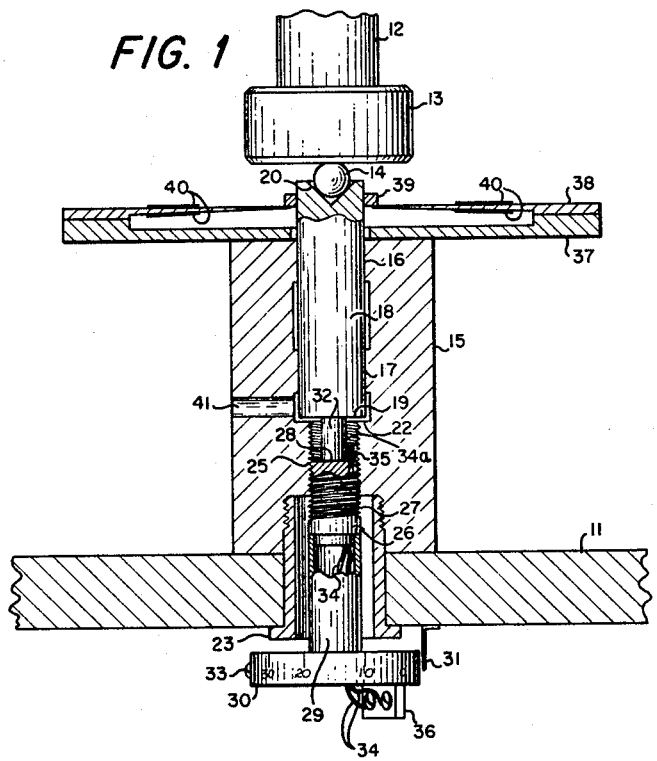

The invention described herein may be manufactured and used by or for the Government of the United States of America for governmental purposes without the payment of any royalties thereon or therefor.

The present invention relates to stress-strain measuring devices and more particularly to a device for rapidly measuring the isothermal stress-strain curve of a test material.

It is well known in the prior art that mechanical tests of a small specimen are often used to simulate the behavior of a material under condition of its service usage. For example, if a structure is to sustain static stresses, then a slow, and thus isothermal stress-strain curve can be used to estimate the strength of its material. If a structure may sustain rapid plastic deformation, then a similarly rapid stress-strain curve would be appropriate. Because of the slow speed of thermal conductivity, structures and specimens of comparable size, cannot lose the heat resulting from the irreversible mechanical work in rapid deformation. The temperature rise can have a significant effect on mechanical properties. In particular the tendency to plastic flow instability, closely related to the rate of strain hardening, can be markedly affected by thermal softening. In cases where both the structure and the specimen which simulates the structure deform adiabatically, the effect on the structure will be faithfully simulated. It is then only necessary to make the strain-rate comparable.

The problem to which the present invention is directed arises when one attempts to simulate the plastic deformation controlling the initiation of a brittle crack under conditions of plane strain. Here it has been found that the fracture toughness $K_{Ic}$ is closely proportional to the strain hardening coefficient $n$. This result is interpreted as meaning that:

(1) A material fractures by subdividing itself into ligamental elements of constant size; and (2) The rupture of these elements controls the unstable growth of the crack. The extensional strain required to rupture the ligament, which directly affects the fracture toughness, is dependent upon its inherent ductility. This can be well characterized by measuring the strain hardening coefficient $n$ of the bulk material from a stress-strain curve. A problem with this simulation, however, is that the ligamental elements are so small and close to unheated elastic material that their elongation and rupture is quenched to the isothermal condition even if the specimen is fractured in the shortest possible time. The tension or compression specimen used to simulate the ligament is so large that it deforms under essentially adiabatic conditions in this time and even to much longer test duration. In this case, the adiabatic ductility or $n$ values can be an incorrect and misleading model of the plastic deformation of the structure, or process zone of a crack.

In the prior art, this problem was handled by measuring the stress-strain curve for continuous high speed deformation, and thus under adiabatic conditions; then an attempt was made to calculate what this curve would have resembled if conditions had been isothermal. The mathematical analysis of this correction is tedious. It requires a complete and elaborate set of flow stress vs. temperature tests in the speed range of interest. The calculation requires the questionable simplifying assumption of the independence of properties on the history of deformation. Providing a solution to this problem, the present invention comprehends a technique and apparatus for dividing the deforming stroke into a series of abruptly interrupted steps. In one embodiment devised for compressive deformation, a rigid cylindrical case is secured to the base of a high-strain-rate testing machine. With a sliding fit therein, a coaxial plunger is connected to the moveable head of a dynamic loader. The plunger can be driven by the machine into solid abutment with the bottom of the case. This bottom is penetrated in its central region by a coaxially threaded base anvil. A cylindrical compression specimen, affixed with a thermocouple to the base anvil, may be threaded into the case until it meets the plunger flush with the bottom of the case. A graduated dial on the threaded anvil permits control of the extent of its protrusion above the stop. The testing machine head, first withdrawn to permit its protrusion to a portion of the total stroke, is actuated to squash the plug flush with the bottom. The extreme abruptness with which the plunger is interrupted and the rigidity of the case minimizes additional deformation as the stress relaxes after the gross movement ceases. While the machine is being unloaded and retracted to permit the next inward protrusion step, the initial condition is restored by a temperature control bath. In this way the yield point load on each compressive step can be taken as an isothermal point on the stress-strain curve. The connection of such points from several successive steps allows reconstitution of a complete isothermal stress-strain curve, no matter how rapid and adiabatic the individual steps.

It is thus an object of the present invention to permit an isothermal stress-strain curve to be constructed from a series of steps of unknown thermal condition.

Another object is to retain the deforming anvil in accurate axiality during the entire series of steps.

Still another object is to facilitate the execution of conventional compression tests in which the deformation is uninterrupted.

Yet another object is to minimize the elastic compliance of the anvils bounding a compression specimen after they have been arrested to terminate a straining step, even when a soft testing machine must be used for loading.

While still another object is to establish a convenient, yet highly accurate technique for recording the stress and strain and strain rate during successive test steps.

Figure 2:
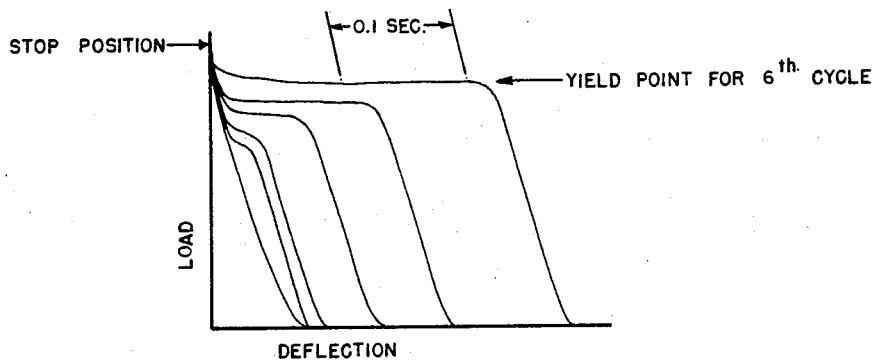

These and other objects of our invention will become apparent with the subsequent specification taken in conjunction with the drawings, of which:

FIG. 1 shows a partially sectional view through a compression subassembly made in accordance with the teaching of the present invention; and FIG. 2 shows a typical record of stepwise deformation and the procedure for converting it to an isothermal true stress vs. strain curve.

Referring now to FIG. 1, the entire subassembly is mounted on a base 11 which may constitute the fixed head of a testing machine or a platform integrally connects thereto. For example, the axially perforated base of a dynamic loader such as shown in U.S. Pat. 3,194,062 is well suited to this purpose. As shown, the movable head 12 of a dynamic loader preferably of low inertia and high stiffness, contacts the moveable end of the subassembly through a contact platten 13 and ball joint 14. Incidental lateral misalignment between the head 12 and loading ball 14 is accommodated by radial clearance therebetween.

It is important that provision for simulation of isothermal deformation by step-wise straining be not deleterious to the essential requirements of a good compression subassembly. To this end a solid metal case 15 having a hole axially bored therein from the upper end is carefully machined to provide highly accurate alignment of bearing bands 16 and 17. A plunger 18 is fitted therein to permit smooth sliding but with a minimum radial clearance. A generous longitudinal separation of the bands 16 and 17 further reduces the possible degree of rotation about a transverse axis. This deforming end 19 of the plunger is finished flat and accurately perpendicular its longitudinal axis, and is constrained to closely parallel displacement in its compression stroke. At the other end, the plunger 18 contains an axially symmetrical depression 20, serving as a concave seat for the ball joint. A corresponding seat 21 is provided in the contact platten 13. The bottom surface 22 of the hole bored into the case 15, acting as the stop, is accurately parallel to plunger end surface 19.

It is essential in this device to obtain access to both ends of the subassembly case 15. The axial perforation of base 11, noted earlier, is fitted with a hollow bolt 23 which is screw-threaded into the bottom of case 15. Radial clearance between bolt 13 and the hole in base 11 may be large if the lateral alignment must be selective or alternatively small, if the hole is already in good alignment with the moveable head 12. A positive clamping force between the bottom face of case 15 and that abutting on base 11 is achieved by tensioning bolt 23 in its holding thread which is internally machined in an axial hole extending upwardly into the bottom of case 15.

As an essential feature, this invention provides a base anvil to support the specimen which is adjustably translatable relative to the arrest position of the moveable anvil, or in this case of the plunger 18. In the embodiment of FIG. 1, the bottoming surface 22 is axially perforated and provided with internal threads 25. A base anvil 26, is correspondingly provided with threads 27 to permit it to be screwed into the thread 25. The mating to threads 25 and 27 is preferably of a precision fit; these threaded elements are used in a manner quite analogous to a micrometer thread. Both threads 25 and 27 are long to provide adequate bearing surface under load; they are of comparable length to permit the specimen-bearing end 28 of anvil 26 to be brought flush with the stop surface 22 for an absolute zero. In this position as well as in the various retracted ones, the end surface 28 is constrained to remain closely parallel to surfaces 19 and 22.

Since access to the anvil 26 is restricted by the central aperture in bolt 23, a tube 29 is appended to provide an extension clear of base 11. A graduated dial 30 is attached to tube 29 providing in conjunction with pointer 21 affixed to base 11 to afford a convenient registration of the degree of excursion of base anvil 26 and the compression specimen 32 which may be mounted upon it. Dial 30 is provided with set screw means 33 by which it can be set to zero as desired. It is most expeditious if the pitch of threads 25 and 27 bear a simple relationship to the prevailing units of length. For example, with 20 thread per inch and 100 divisions on the dial 30, every two divisions represent an excursion of $\frac{1}{1000}$ inch. With metric standards some multiple of the millimeter would be more convenient.

Obviously, if one is attempting to simulate a constant temperature, the device must be equipped to measure this temperature. For the most reliable measure, direct contact of a temperature sensor with the specimen is provided in this device. A thermocouple lead 34 is led through tube 29, through a small hole or aperture 35 in anvil 26, emerging near the periphery of anvil surface 28, clear of its bearing surface and connected with a thermocouple 34a. The thermocouple leads may be conveniently terminated in an electrical connector 36 attached to dial 30 and/or tube 29, preferably one with contact metals matching that of the thermocouple wires. In this way the leads to the temperature measuring device may be disconnected when the anvil 26 is to be withdrawn or inserted.

In devices of this kind it is best to measure the extent of deformation close to, if not, on the specimen. However it is much more convenient to measure head displacement of the testing machine. The compromise shown in FIG. 1, embodies the best features of both locations. A pair of radial extension arms 37, attached to case 15, form a rigid frame of reference. A set of flexible cantilever beams 38, attached to diametrically opposite locations on arms 37, extend inwardly toward plunger 18 where their tips are engaged by a collar 29 on the plunger. These are deflected inward as the plunger 18 is pushed to the stop 12. Their inherent resilience serves to raise the plunger when the head 12 is raised. The bending strain in these beams 38 is detected by a bridge of electrical resistance type strain gages 40. By measuring in this location, there is little elastic distortion between the specimen and the measuring point; only a fraction of that which would be measured on the testing machine head 12. In this location the transducer is accessible and can be made of adequate size, yet of good frequency response. When properly proportioned, as will be apparent to those skilled in the art, the load required to deflect the displacement transducer will be small relative to the load on the specimen. This is important as the load cell is generally located on the testing machine so that it also measures the elastic reaction of the displacement transducer.

In actual use, the case 15 may be surrounded by a temperature control chamber. Various well known schemes may be adapted, but none will be described here as these are not the subject of the present invention. Venting (and inspection) ports 41 may be provided to provide direct access of the heat transfer media to the specimen.

In a typical use, the specimen 32 to be tested is mounted centrally on the top surface 28 of base anvil 26, and the thermocouple 34a is attached to the specimen. With the plunger end 19 touching stop 22, the specimen and anvil can be inserted and threaded into contact. Dial 20 is then set to zero and locked with clamp 23. The testing machine speed should also be pre-set. Then the head 12 can be retracted to permit the protrusion of specimen 32 above stop 22 by the amount desired for the first step. When the test temperature is reached, the machine is actuated forcing head 12 and plunger 18 downward. A suitable X-Y recorder, such as a cathode ray oscillograph, can be connected to record the load on and displacement of plunger 18 during this stroke. For the record shown in FIG. 2, the process was repeated six times until the desired total strain was reached. The steps were programmed to provide roughly equal relative-strain increments for equal spacing on a logarithmic plot. As the compression detecting beams measure relative to the fixed case and not to the threaded anvil, the terminal position is fixed, so that the loading envelopes overlay and clear each other as the strain increments are increased. The log plot of compressive stress vs. strain can be corrected to true stress by dropping each stress point a percentage equal to the strain. There is litle difference between the true and compressive strains in these levels of strain and strain hardening rate so no correction of it is made.

Data taken off in this case includes the plastic strain rate, the strain hardening exponent $n$ and the true (flow) stress at 3% strain. The isothermal $n$ value, or relative strain hardening coefficient, is directly related to the fracture toughness as noted in the introductory description.

The materials of construction for the device of this invention may vary without departing from its scope. It will generally be desirable to make the anvils 18 and 26, which contact the specimen, of a material of high hardness level. Quenched and tempered steel has been quite serviceable in the existing units. The case 15 can be hardened somewhat to reduce the tendency to foul the bearing surfaces 16 and 17 and increasing the strength of threads 25. However it may be tempered back to regain machinability after heat treatment. The strain gage beams 38 should also be of hardened material to permit the largest possible elastic deflection.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A subassembly for use with a compression testing machine for step-wise compressive deformation which comprises:
    a cylindrical case having an axial cylindrical passageway therethrough,
    said passageway having upper, intermediate, and lower sections along the length of said case, each of which have a uniform diameter along the length thereof,
    said intermediate section having a diameter which is less than said upper section thereby forming a bottom for said upper section and including screw threads along the surface thereof,
    a threaded anvil,
    said threaded anvil adapted to be threaded into said intermediate section for rotation therealong,
    means for measuring the axial translation of said anvil within said threaded intermediate section of said case,
    a plunger fitted for sliding movement within said upper section of said case into abutment with the bottom thereof formed by said intermediate section,
    whereby said plunger is adapted to apply a pressure on a specimen held between said anvil within said intermediate section and said plunger, and
    means for measuring the axial translation of said plunger.
2. A subassembly as claimed in claim 1, wherein:
    said plunger is of greater length than said upper section of said case.
3. A subassembly as claimed as claim 1, which includes:
    means for admitting a coolant onto a specimen held axially between said anvil and said plunger.
4. A subassembly as claimed in claim 3, which includes:
    means for measuring the temperature of said specimen held by said subassembly.
5. A subassembly as claimed in claim 1, wherein:
    said lower section of said cylindrical case has a greater diameter than said intermediate section.
6. A subassembly as claimed in claim 5, wherein:
    said lower section of said passageway has threads on the surface thereof for receipt of a threaded means for securing said subassembly to a support supported by said testing machine.
7. A subassembly as claimed in claim 2, which includes:
    means for measuring the temperature of said specimen.
8. A subassembly as claimed in claim 7, which includes:
    means for admitting a coolant onto a specimen held axially between said anvil and said plunger.
9. A subassembly as claimed in claim 8, which includes:
    means for securing the subassembly to a compression test machine.

References Cited

UNITED STATES PATENTS 2,482,147  9/1949  Bashore _____ 73—94

RICHARD C. QUEISSER, *Primary Examiner.*

J. H. WILLIAMSON, *Assistant Examiner.*